United States Patent Office 3,525,760
Patented Aug. 25, 1970

3,525,760
DIORGANOTIN DI(THIOALKYLENE CARBOXYLIC ACID ESTERS) AND THE PREPARATION THEREOF
Toshio Seki, Osaka-shi, and Kozaburo Suzuki, Kobe-shi, Japan, assignors to Nitto Kasei Co., Ltd., Osaka, Japan, a corporation of Japan
No Drawing. Original application May 16, 1967, Ser. No. 638,774. Divided and this application June 26, 1969, Ser. No. 851,120
Int. Cl. C07f 7/22
U.S. Cl. 260—429.7     5 Claims

ABSTRACT OF THE DISCLOSURE

Sulfur containing organotion compounds of the formula $$R_2Sn[S(CH_2)_mCOO(CH_2CH_2O)_nY]_2$$

prepared by the reaction of an ester and a dialkyltin oxide may be used as stabilizers for resins.

---

This application is a division of co-pending application Ser. No. 638,774, filed May 16, 1967, and now abandoned.

This invention relates to novel sulfur containing organotin compounds, to the preparation of such compounds, and to polyvinyl chlorides, copolymers with vinyl chlorides as the main constituent, or these resins-based polyblends, stabilized with said sulfur containing organotin compounds.

There have been heretofore used a number of different types of sulfur-containing organotin compounds known as stabilizers for these resins (as are disclosed in Japanese patent publications Nos. 789/57, and 5282/59), but these conventional stabilizers may be characterized by unsatisfactory stabilizing ability because of volatilization during the process of producing resins at elevated temperatures, and since they possess a sharp odor characteristic of mercaptan, not only do they make operators feel uncomfortable, but they often give a bad influence to the human body. In addition, as these stabilizers may not prevent a resinous composition containing same from adhering to a roll, and also may not reduce a gelling time, it is hard to conduct operations efficiently or handily for prolonged periods of time without the aid of supplementary stabilizers. Furthermore, halogen containing resins often undergo a change of physical properties (e.g. increasing of fragility) by the addition of these sulfur containing organotin compounds.

According to the present invention, these adverse effects may be reduced or eliminated by employing a new class of sulfur containing organotin compounds as stabilizers.

It is an object of this invention to provide novel sulfur containing organotin compounds and methods of producing such compounds. A further object of this invention is to provide polyvinyl chlorides, copolymers with vinyl chlorides as the main constituent, or these resins-based polyblends, stabilized with these novel sulfur containing organotin compounds. Other objects will be apparent to those skilled-in-the-art from the following description.

In accordance with certain of its aspect, the method of this invention for stabilizing polyvinyl chlorides, copolymers with vinyl chlorides as the main constituent, or those resin-based polyblends against the deteriorating effects of heat and light comprises incorporating into said halogen containing vinyl resins an inhibiting amount of a sulfur containing organotin compound having the following formula $$R_2Sn[S(CH_2)_mCOO(CH_2CH_2O)_nY]_2$$

wherein R is alkyl of 1–8 carbon atoms, m and n are each integers from 1 to 2, inclusive, and Y is selected from the group consisting of alkyl of 1–8 carbon atoms, and phenyl.

Since a sulfur containing organotin compound employed in the invention has at least two ether linkages in its molecule, it is less volatile than the conventional stabilizers, and the liability of the sulfur containing organotin compound in a resin composition to escape therefrom is much less than that of the conventional stabilizer. The low volatility of the sulfur containing organotin compounds make them especially useful as stabilizers in halogen containing vinyl resin formulations which require heat or exposure to elevated temperatures during use or during the processing of the halogen containing vinyl resin material. At the same time since the sulfur-containing organotin compounds have both ester and ether linkages in their molecules, these novel stabilizers may exhibit a good compatibility with resins and an accelerated gelation; they may make the lowest processable temperature of resins reduced about 5° C. compared with the conventional stabilizers; and resin compositions containing said novel stabilizers may perform over longer periods of time during the heat processing of same. A new class of these compounds also may impart an improved satisfactory stabilizing effect against degradation by light to resins compared with the conventional sulfur-containing organotin compounds which are unstable to light. Besides, there is not practically a disgusting smell of mercaptan during the process of producing stabilized resins, and consequently they do not affect badly to a person.

Specific examples of the sulfur-containing organotin stabilizers which are within the scope of this invention include, among others, the following:

$(C_4H_9)_2Sn(SCH_2COOCH_2CH_2OC_6H_5)_2$
$(CH_3)_2Sn(SCH_2CH_2COOCH_2CH_2OCH_2CH_2OCH_3)_2$
$(C_8H_{17})_2Sn(SCH_2COOCH_2CH_2OC_4H_9)_2$
$(C_4H_9)_2Sn(SCH_2COOCH_2CH_2OCH_2CH_2OC_2H_5)_2$
$(C_8H_{17})_2Sn(SCH_2COOCH_2CH_2OCH(CH_3)_2)_2$
$(C_4H_9)_2Sn(SCH_2COOCH_2CH_2OCH_3)_2$
$(C_4H_9)_2Sn(SCH_2COOCH_2CH_2OC_2H_5)_2$
$(C_4H_9)_2Sn(SCH_2COOCH_2CH_2OC_4H_9)_2$
$(C_4H_9)_2Sn(SCH_2COOCH_2CH_2OC_8H_{17})_2$
$(C_4H_9)_2Sn(SCH_2COOCH_2CH_2OCH_2CH_2OCH_3)_2$
$(C_4H_9)_2Sn(SCH_2COOCH_2CH_2OCH_2CH_2OC_4H_9)_2$
$(C_4H_9)_2Sn(SCH_2CH_2COOCH_2CH_2OCH_3)_2$
$(C_4H_9)_2Sn(SCH_2CH_2COOCH_2CH_2OC_4H_9)_2$
$(C_4H_9)_2Sn(SCH_2CH_2COOCH_2CH_2OCH_2CH_2OCH_3)_2$
$(C_4H_9)_2Sn(SCH_2CH_2COOCH_2CH_2OCH_2CH_2OC_4H_9)_2$
$(C_5H_{11})_2Sn(SCH_2COOCH_2CH_2OC_4H_9)_2$

In acordance with certain aspects of this invention, the method of preparing sulfur-containing organotin compounds comprises the steps of:

(a) Reacting an ethanol derivative having at least two ether linkages therein, e.g. methyl Cellosolve, ethyl Cellosolve, isopropyl Cellosolve, butyl Cellosolve, phenyl Cellosolve, methyl Carbitol, ethyl Carbtol, and butyl Carbitol, with a mercapto acid, e.g. thioglycolic acid, and β-mercaptopropionic acid by the conventional method to form an ester, (b) Heating with stirring said ester and a dialkyltin oxide, e.g. dimethyltin oxide, dibutyltin oxide, diamyltin oxide, and dioctyltin oxide in the presence (or absence) of an inert solvent, and (c) Removing water formed in the reaction.

Only an inhibiting amount of organotin compound is required. Preferably, the amount of the sulfur containing organotin stabilizers to be employed in the process of this invention is in the range of 0.1 to 10 parts by weight per 100 parts by weight of the resins. The stabilizers may be used singly or in combination, and they may also be used together with other known stabilizers, and with other additives such as a mold lubricant, an antioxidant, and a U.V. absorber.

EXAMPLE 1

A three-necked flask, equipped with a stirrer and a Dean trap, was charged with 1.1 mole of thioglycolic acid, 1 mole of butyl Cellosolve, 200 ml. of benzene as solvent, and 1.2 g. of p-toluenesulfonic acid as esterification catalyst. This mixture was reacted by the conventional method to form 180 g. (93.5%) of butyl Cellosolve thioglycollate ($HSCH_2COOCH_2CH_2OC_4H_9$). A three-necked flask, equipped with a stirrer and a Dean trap, was charged with 0.5 mole of said ester, 0.25 mole of dibutyltin oxide, and benzene as solvent. This mixture was heated with stirring until all the water of reaction was removed. The benzene was then distilled off under reduced pressure to yield 153 g. (99.5%) of dibutyltin-bis-(butyl Cellosolve thioglycollate), $(C_4H_9)_2Sn(SCH_2COO \cdot CH_2CH_2OC_4H_9)_2$ (A). The product is a colorless, transparent liquid. The physical properties: $n_{30}^D = 1.5041$; $D_4^{20} = 1.180$.

*Analysis.*—Calculated (percent): Sn, 19.4; S, 10.45. Found (percent): Sn, 19.6; S, 10.40.

To 100 parts by weight of polyvinyl chloride (mean polymerization degree: 1,100) was added 2 parts by weight of said dibutyltin-bis-(butyl Cellosolve thioglycollate) (A). The mixture was sheeted by milling for 5 minutes on a mixing roll heated to 160°±2° C. For comparative purposes, by the same procedure, a sheet was made containing 2 parts by weight of dibutyltin didodecyl mercaptide, $(C_4H_9)_2Sn(SC_{12}H_{25})_2$ (B) as prior art sulfur containing stabilizer in place of the stabilizer of this invention.

The obtained sheets were tested in a Geer oven heated to 180° C. for heat stability, and the discoloration was observed. The same sheets prepared for a weathering test were irradiated for 500 hours in a weatherometer, equipped with a xenon lamp which is screened by a heat resisting optical glass filter in order to cut off ultraviolet rays below the wave-length of 279 mμ, and the discoloration and the deterioration other than that in appearance were observed. For volatility the stabilizers were tested by weighing precisely each of compounds (A) and (B) in dishes; heating the dishes to 180° C. in a Geer oven for 1 hour; and measuring the weight loss. Results are shown in the following Table I.

TABLE I

| Stabilizer | Test for heat stability—Color of sheet after— | | | | Test for weatherability | | Heating loss of stabilizer (percent) |
|---|---|---|---|---|---|---|---|
| | 0.5 hr. | 1.0 hr. | 1.5 hrs. | 2.0 hrs. | Color of sheet after 500 hrs. | Appearance of sheet after 500 hrs. | |
| (A) | Colorless | Colorless | Colorless | Light yellow | Colorless | No crazing | 0.4 |
| (B) | do | do | Light yellow | Yellow | Brown | A few lines of crazing. | 3.0 |

Moreover, in order to prove a good workability of resinous composition containing the stabilizer of this invention, a test was conducted to determine the lowest possible surface temperature of a roll so that a completely gelatinated transparent sheet might be obtained. Processing at 145° C. was sufficient to make such a sheet in the case of using stabilizer (A), whereas in the case of using stabilizer (B), processing even at 150° C. was not sufficient. It is a great advantage to be able to lower a processing temperature by 5° C. in the process of molding heat sensible polyvinyl chlorides.

EXAMPLE 2

In a manner similar to that of Example 1, butyl Carbitol thioglycollate was synthesized by the reaction of butyl Carbitol and thioglycolic acid, and 0.5 mole of said butyl Carbitol thioglycollate was allowed to react with 0.25 mole of dioctyltin oxide to yield 200 g. (98.0%) of dioctyltin-bis-(butyl Carbitol thioglycollate),

(C). The product is a light yellow, transparent liquid. The physical properties; $n_{30}^D = 1.4926$; $D_4^{30} = 1.104$.

*Analysis.*—Calculated (percent): Sn, 14.5; S, 7.86. Found (percent): Sn, 14.9; S, 7.71.

A mixture of 100 parts by weight of copolymer consisting of 95% by weight of vinyl chloride and 5% by weight of vinyl acetate, and 3 parts by weight of said compound (C), and a mixture, for comparisons, of 100 parts by weight of said copolymer and 3 parts by weight of dioctyltin bis-(octyl thioglycollate),

(D) were sheeted by milling for 5 minutes on a mixing roll heated to 150°±2° C. The sheets were tested for heat stability and weatherability, and the stabilizers tested for volatility in a manner similar to that of Example 1. Results are shown in Table II.

TABLE II

| Stabilizer | Test for heat stability—Color of sheet after— | | | | Test for weatherability | | Heating loss of stabilizer (percent) |
|---|---|---|---|---|---|---|---|
| | 0.5 hr. | 1.0 hr. | 1.5 hrs. | 2.0 hrs. | Color of sheet after 500 hrs. | Appearance of sheet after 500 hrs. | |
| (C) | Colorless | Colorless | Light yellow | Yellow | Light yellow | Almost no crazing | 0.8 |
| (D) | do | Light yellow | Yellow | Brown | Liver-colored | Entirely fine crazing. | 4.7 |

The same resin compositions as aforesaid were milled on a mixing roll heated to 150°±2° C. until the sheets thus obtained become discolored light yellow. The stabilizer (C)—containing sheet required blending for 19 minutes to be light yellow in color, whereas the stabilizer (D)—containing one required blending for 13 minutes. This demonstrates that novel stabilizer (C) may not only impart good heat stability to a product, but it may prevent the resin composition from adhering to a roll, and makes it possible to set a roll in motion over a longer period of time.

sulfur-containing organotin compounds having ether linkages in their molecules may impart a good gelatinousness and lubricity to vinyl chloride resins, they may inhibit the stay of a resinous composition in the extruder, the adhesion, and the thermal decomposition; consecutively operatable time may be prolonged; and as a result, workability may be much improved.

Thus obtained pipes were tested for heat stability and weatherability by the same method as in Example 1, and also loss on heating of stabilizers (E) and (F) was measured. Results are shown in Table III.

TABLE III

| Stabilizer | Test for heat stability | | | | Test for weatherability | | Heating loss of stabilizer (percent) |
|---|---|---|---|---|---|---|---|
| | Color of pipe | | | | Color of pipe | Appearance of pipe | |
| | After 0.5 hr. | After 1.0 hr. | After 1.5 hrs. | After 2.0 hrs. | After 500 hrs. | After 500 hrs.. | |
| (E) | Colorless | Colorless | Light yellow | Yellow | Light yellow | Transparent | 0.5 |
| (F) | do | Light yellow | Yellow | Brown | Liver-colored | Cloudy white | 2.3 |

EXAMPLE 3

In a manner similar to that of Example 1, 180 g. (98.3%) of dibutylin bis-(butyl Carbitol-β-mercaptopropionate), $(C_4H_9)_2Sn(SCH_2CH_2COOCH_2CH_2OCH_2CH_2OC_4H_9)_2$ (E) was obtained from 0.25 mole of dibutyltin oxide and 0.5 mole of butyl Carbitol-β-mercaptopropionate. The product is a light yellow, transparent liquid. The physical properties: $n_{30}{}^D = 1.4981$; $D_4{}^{30} = 1.152$.

*Analysis.*—Calculated (percent): Sn, 16.2; S, 8.77. Found (percent): Sn, 16.8; S, 8.54.

To 100 parts by weight of a polyblend consisting of 95% by weight of polyvinyl chloride and 5% by weight of styrene-butadiene-acrylonitrile terpolymer, 3 parts by weight of said compound (E) was added as stabilizer. For comparative purposes, to the coinciding amount of the same polyblend, the coinciding amount of dibutyltin-β-mercaptopropionate

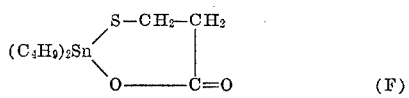

(F)

was added as known sulfur-containing stabilizer in place of compound (E). These mixtures were blended on a Herschel mixer, and gelling point and time were measured. The mixture containing stabilizer (E) got gelatinized at 133° C. after 6 minutes and 30 seconds, whereas the mixture containing stabilizer (F) got gelatinized at 137° C. after 7 minutes and 15 seconds. Each of the mixtures was continued to be compounded by mixing until they were heated to 150° C., and the mixtures were extrusion-molded into pipes of 25 mm. in the outside diameter and 15 mm. in the inside diameter by a screw extruder having a screw diameter of 65 mm. at an extruder head temperature of 185° C. and at a cylinder temperature of 170° C. Each stabilizer-containing pipes were weighed after extrusion-molded for 2 minutes. The stabilizer (E)-containing pipe weighed 680 g., whereas the stabilizer (F)-containing one weighed 590 g. Consecutively operatable time of the extruder was also measured. When stabilizer (E) was employed as additive, the extruder could be operated more than 25 hours. On the other hand, when stabilizer (F) was employed, the extruder could be operated only 4 hours. As is apparent from the above results, since The smell of molded pipes was then examined 5 hours after extrusion-molding. The molded pipes containing stabilizer (F) had a strong odor characteristic of sulfur, whereas the molded pipes containing stabilizer (E) had a much diminished odor of sulfur.

Although this invention has been illustrated by reference to specific examples, numerous changes and modifications thereof which clearly fall within the scope of the invention will be apparent to those skilled-in-the-art.

What is claimed is:

1. The compound having the formula $R_2Sn[S(CH_2)_mCOO(CH_2CH_2O)_nY]_2$ wherein R is alkyl of 1–8 carbon atoms, $m$ and $n$ are each integers from 1 to 2, inclusive, and Y is selected from the group consisting of alkyl of 1–8 carbon atoms, and phenyl.

2. The compound as claimed in claim 1 having the formula $(C_4H_9)_2Sn(SCH_2COOCH_2CH_2OC_4H_9)_2$ 3. The compound as claimed in claim 1 having the formula $(C_8H_{17})_2Sn(SCH_2COOCH_2CH_2OCH_2CH_2OC_4H_9)_2$ 4. The compound as claimed in claim 1 having the formula $(C_4H_9)_2Sn(SCH_2CH_2COOCH_2CH_2OCH_2CH_2OC_4H_9)_2$ 5. The method of preparing the compound of claim 1 which comprises reacting an ethanol derivative having at least two ether linkages therein, and a mercapto acid to form an ester; heating with stirring said ester and a dialkyltin oxide; and removing water formed in the reaction.

References Cited

UNITED STATES PATENTS

| 2,832,751 | 4/1958 | Weinberg | 260—429.7 X |
| 3,115,509 | 12/1963 | Mack | 260—429.7 |
| 3,478,071 | 11/1969 | Weisfeld | 260—429.7 |

TOBIAS E. LEVOW, Primary Examiner

W. F. W. BELLAMY, Assistant Examiner

U.S. Cl. X.R.

260—45.75